Jan. 30, 1951 A. V. LAPISH 2,539,441
AUTOMATIC RECORD CHANGER
Filed Oct. 30, 1944 7 Sheets-Sheet 1

INVENTOR
ARLINGTON V. LAPISH

BY
ATTORNEY

Jan. 30, 1951          A. V. LAPISH          2,539,441
AUTOMATIC RECORD CHANGER Filed Oct. 30, 1944          7 Sheets-Sheet 2

FIG. 2

INVENTOR
ARLINGTON V. LAPISH

BY

ATTORNEY

Jan. 30, 1951     A. V. LAPISH     2,539,441
AUTOMATIC RECORD CHANGER Filed Oct. 30, 1944     7 Sheets-Sheet 3

INVENTOR
ARLINGTON V. LAPISH
BY
ATTORNEY

Jan. 30, 1951  A. V. LAPISH  2,539,441
AUTOMATIC RECORD CHANGER
Filed Oct. 30, 1944  7 Sheets-Sheet 4

INVENTOR
ARLINGTON V. LAPISH

BY

ATTORNEY

Jan. 30, 1951   A. V. LAPISH   2,539,441
AUTOMATIC RECORD CHANGER
Filed Oct. 30, 1944   7 Sheets-Sheet 6

INVENTOR
ARLINGTON V. LAPISH
BY
ATTORNEY

Jan. 30, 1951

A. V. LAPISH

2,539,441

AUTOMATIC RECORD CHANGER

Filed Oct. 30, 1944

INVENTOR
ARLINGTON V. LAPISH

BY

ATTORNEY

Patented Jan. 30, 1951

2,539,441

UNITED STATES PATENT OFFICE 2,539,441

AUTOMATIC RECORD CHANGER

Arlington Victor Lapish, Fort Wayne, Ind., assignor, by mesne assignments, to Farnsworth Research Corporation, a corporation of Indiana Application October 30, 1944, Serial No. 560,969

3 Claims. (Cl. 274—10)

This invention relates to automatic phonographs and is more particularly directed to an automatic phonograph for automatically and successively reproducing each side of each record in a stack of records.

Conventional automatic phonographs have been provided with a considerable number of mechanisms of different types for reproducing records on both sides and for reproducing intermixed records of different diameters. These mechanisms are characterized by their inability to handle records quietly because in many cases they do not positively control the motion of each record during the handling operation. For example, certain types of record-changing mechanisms release each record from a magazine and allow it to move with a relatively free dropping motion or a relatively free sliding motion whereby considerable noise is generated.

Prior art automatic phonographs are also characterized by their complicated and expensive assembly of cams, gears and levers which require delicate adjustments. As a result of these characteristics, such mechanisms are frequently subject to considerable breakage of parts and mutilation of records. For example, when a delicate adjustment changes due to external forces, such as vibration or careless operation, such mechanisms may literally tend to destroy themselves. Also, they may mutilate the records during a change cycle due to failure of a record to be engaged by the proper mechanism at the proper time.

The principal object of this invention is to provide an automatic phonograph mechanism for playing a plurality of records on each side and characterized by its ability to handle records quietly without mutilating the records or otherwise operating in a faulty manner.

Another object of this invention is to provide an automatic phonograph having a simple record-handling mechanism which controls the motion of each record in a positive manner during the record-changing cycle.

Still another object of this invention is to provide an automatic phonograph for playing both sides of each record of a plurality of records and having a simple record-handling and control mechanism which does not require delicate adjustment.

In accordance with the broad concept of this invention, there is provided an automatic phonograph comprising a turntable and a first and second record-storing means. The first record-storing means cooperates with a record-releasing and conveying means which is adapted positively to engage and release a record and convey it to the turntable. After one side of the record is reproduced, there is provided a means for positively engaging and elevating the record above the turntable and for automatically rotating and lowering the record to the turntable in reversed position. For removing the record from the turntable to the second record-storing means, there is provided an elevator for positively engaging the record and moving it from the turntable to the second storing means. For moving the record-handling means in timed relation with one another, there is provided a unitary change-cycle control mechanism.

There is also provided in accordance with this invention a pivoted and vertically movable record-releasing and conveying means comprising a base and a record-supporting arm for positively engaging a record and conveying it to the turntable. On the base there are provided first and second members for engaging records of different sizes whereby either a large or small record may be removed from the record-storing means to the turntable. For moving the record-conveying means in a vertical plane and also about its pivot point, there are provided a cam and a lever which form a part of a unitary change-cycle control mechanism.

For controlling the tone arm to place it in the initial playing groove of a large or small record, there is provided a pivoted cam member operatively associated with the record-releasing and conveying means. The cam member includes a record-engaging arm arranged in the path of movement of a large record whereby when such a record is released, the cam member is moved into a position to guide the tone arm into engagement with the initial playing groove of the record. There is also provided a means operatively associated with the record-handling mechanism for normally returning the cam member during each change cycle to its normal position for guiding the tone arm into the initial playing groove of a small record.

For reversing a record after the first side is reproduced, there is provided a pivoted horizontal member adjacent the turntable which is movable by a unitary change-cycle control mechanism about a horizontal axis. A pair of arms is pivoted to the horizontal member for movement about a vertical axis toward and away from the periphery of a record on the turntable. At the outer extremities of the arms, there are provided record-grasping devices, one of which consists of a rotatable pulley including a clutch operatively associated therewith for linking the pulley and the record-grasping means when the arms move to engage a record. Cable means attached to the pulley and fixed at the other end automatically rotates the pulley and therewith the record as the arms move vertically. For automatically pivoting the arms toward a record on the turntable and raising them, there is provided a cable means operatively associated with a unitary change-cycle control mechansim.

For elevating records from the turntable and placing them in the second record-storing means, there is provided a pivoted elevator means adjacent the turntable and the second record-storing means and operatively associated with the unitary change-cycle control means for elevating a played record about the pivot point of the elevator means. As the elevator means rotates about its pivot, the record moves into engagement with a pair of guides having curved surfaces for guiding the record to its rest position in the second record-storing means.

The unitary change-cycle control means comprises a unitary rotatable cam consisting of a number of cam surfaces for operating an equal number of mechanical linkages associated respectively with the tone arm, the record-releasing and conveying means, a record-reversing means and a record-elevating means. The change cycle is initiated by a switch mechanism operatively associated with a drive means, said switch being responsive to the movement of the tone arm when it tracks the tripping groove of a record. When the switch is closed, the drive means operates the unitary cam means for operating the record-handling mechanism through each phase of its record-changing and reversing cycle.

For a better understanding of the invention, together with other and further objects thereof, reference is made to the following description, taken in connection with the accompanying drawings, and its scope will be pointed out in the appended claims.

In the accompanying drawings.

Referring to the drawings, there is provided an automatic phonograph comprising a base plate 2 upon which is mounted a turntable 4 for rotation on record-centering spindle 3. Suspended beneath the base plate is a turntable driving motor 6 which is adapted to drive continuously the turntable in a conventional manner such, for example, as shown in the U. S. patent of J. H. Pressley, No. 2,313,262, granted March 9, 1943.

Figure 2:
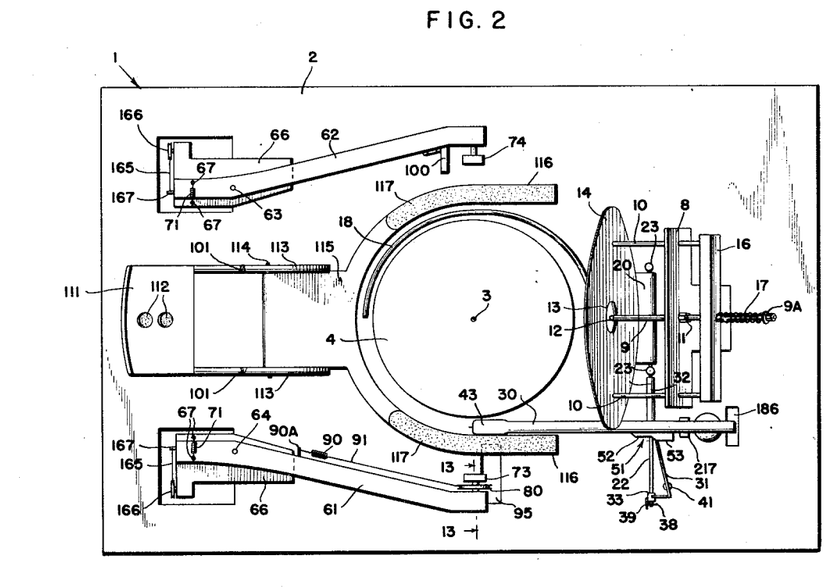
Fig. 2 is a top plan view of the phonograph of Fig. 1 illustrating the record-handling mechanism and the record-storing means with the records removed therefrom.
Figure 18:
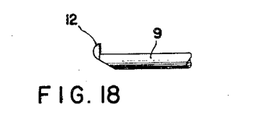
Fig. 18 is an enlarged detail view of the record-retaining means associated with the first record-storing means.
Figure 19:
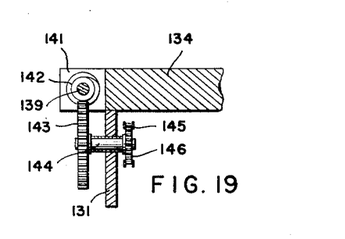
Fig. 19 is an enlarged section taken on line 19—19 of Fig. 3.
Figure 20:
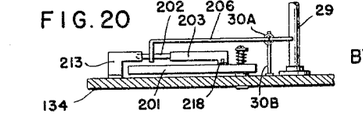
Fig. 20 is a section taken on line 20—20 of Fig. 16.

Adjacent the turntable, there is provided a first record-storing magazine for storing a stack of records 7 which are intended to be transferred one at a time to the turntable. The magazine includes a standard 8 secured in any known manner to base plate 2. For supporting a stack of records, there is provided at the upper end of standard 8 a spindle 9 having a diameter approximately equal to that of the centering aperture of a record. At the forward end of spindle 9, there is provided a hooked portion 12 (Figs. 2 and 18) which is adapted to engage the outermost record of the stack adjacent the edge of its centering aperture. The spindle 9 is fixed to the upper end of standard 8 by a suitable means 11 such, for example, as a pair of nuts threaded to the spindle and in engagement with each side of the standard. For moving the stack of records into engagement with the hooked portion 12 on spindle 9 and aligning them in predetermined position relative to the turntable, there is provided a disc 14 and, at the upper end of standard 8 and in the same plane with the spindle, an assembly consisting of a pair of guide rods 10, 10, the forward ends of which are utilized for supporting the disc 14 having a centrally disposed aperture 13 through which the spindle extends. At the rearward end of the rods 10, there is fixed a cross-member 16 which acts as a guide member and is guided by an extension of spindle 9. For urging the rods 10 and therewith the disc 14 toward the hooked portion 12 of spindle 9, there is provided a compressed spring member 17 which engages cross-member 16 around the central aperture thereof and also engages retaining means 9A which may comprise, for example, a washer disposed at the end of spindle 9 and fixed thereto by any suitable means such, for example, as a threaded nut. Under the biasing action of spring 17, disc 14 exerts forward pressure on the rearmost record of the stack for moving the stack in a forward direction when the foremost record is removed therefrom. Also the foremost record is always positioned in proper alignment to be released and moved to the turntable in a manner which will be described hereinafter.

For releasing and conveying each record from the stack to the turntable, there is provided a record-releasing and conveying means (Figs. 2, 3, 11 and 12) comprising a curvilinear member 18 which in its rest position partially encircles the turntable 4. Curvilinear member 18 is affixed as at 19 to a plate 20 which is pivoted on the base plate by means of the shaft 22 rotatably mounted on the vertical studs 23, 23. For permitting vertical motion of studs 23, 23 and therewith the record-releasing and conveying means, there are provided bearings 21, 21 affixed to the base plate 2. For biasing plate 20 downwardly into its rest position, there is provided a spring 20A fixed to base plate 2 by bracket 20B and to plate 20 at 20C by any suitable means. Extending through the plate 20 is a pair of pins 24, 24 which are biased by springs 25, 25 for engaging the periphery of a small record when the record-releasing and conveying means is moved into position to remove a record from the magazine. For engaging a large record, there is provided on the outer edges of the plate 20 a pair of pivotally mounted record-engaging latches 26, 26 which are disposed to engage the periphery of a large record when the record-releasing and conveying means is moved into position to remove a record from the magazine. Latches 26, 26 are pivoted at 26A so that the ends 27, 27 are slightly overbalanced to project above the face of the plate 20. Thus when a large record is in the release position, the ends 27, 27 of the latches engage the surface of the record as the record-releasing and conveying member moves into position to remove a record from the magazine. This engagement of the ends 27, 27 of the latches pivots them into position so that hooks 26B engage the outer periphery of a large record whereby the record may be moved off the hook 12 of spindle 9 when the record-releasing and conveying means is moved in a vertical plane as will be explained hereinafter.

For reproducing records on the turntable, there is provided a conventional tone arm 30 pivotally mounted at 28 on shaft 29 for horizontal and vertical movement. Shaft 29 is supported in conventional bearings 29A. For positioning the tone arm 30 in the initial playing groove of either a small or a large record, there is provided a cam guide consisting of a triangular member 31 pivotally mounted in bearings 32 and 33 (Figs. 11 and 12) rotatably mounted on the outer portion of the shaft 22. For controlling the position of cam 31, there is provided in fixed relation to bearing 32 and cam 31, a pair of stops 34 and 36 which are disposed to engage the base plate and thereby position cam 31 in a predetermined forward position or a predetermined rearward position. Stop 34 includes an extension 37 which projects upwardly into the path of a large record for moving member 31 in a counterclockwise direction whereby to position the tone arm in the initial playing groove of a large record as will be described hereinafter. At the extreme outer end of shaft 22 there is provided a pin 38 which extends through the shaft to engage projection 39 on bearing 33 for moving member 31 in a clockwise direction whereby normally to position member 31 for placing the tone arm in the initial playing groove of a small record as will be explained in more detail hereinafter. For aiding the movement of member 31 and maintaining it in its proper operated positions, there is provided a weight 41 suspended from member 31 as illustrated in the drawings.

Tone arm 30 is provided intermediate the ends thereof with a cam 51 comprising a first cam surface 52 and a second cam surface 53, either of which may cooperate with member 31 to position the tone arm on a large or small record. When the tone arm is being lowered at the end of a record-changing cycle, either cam surface 52 or cam surface 53 will engage the inclined surface of triangular cam member 31. If a large record has been moved to the turntable, member 31 has been moved to its forward position into alignment with cam surface 52 whereby tone arm 30 is lowered into engagement with the initial playing groove of a large record. If a small record has been placed on the turntable, member 31 is in the position illustrated in Fig. 1 of the drawings whereby cam surface 53 engages member 31. It is to be noted that this cam surface is spaced at a greater distance from tone arm 30 than is the cam surface 52 whereby tone arm 30 is moved a greater distance toward the center of the turntable and into engagement with the initial playing groove of a small record.

Figure 6:
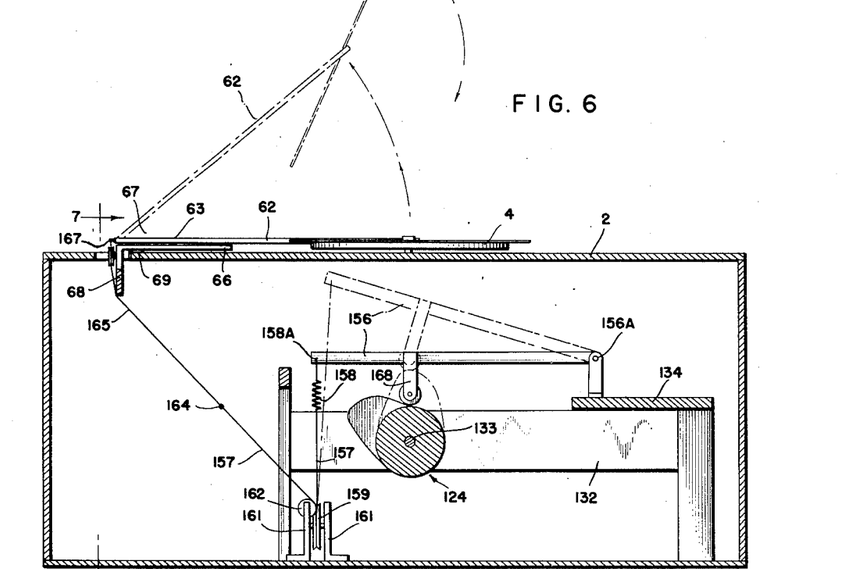
Fig. 6 is a section taken on line 6—6 of Fig. 4 illustrating the operation of the record-reversing mechanism.
Figure 7:
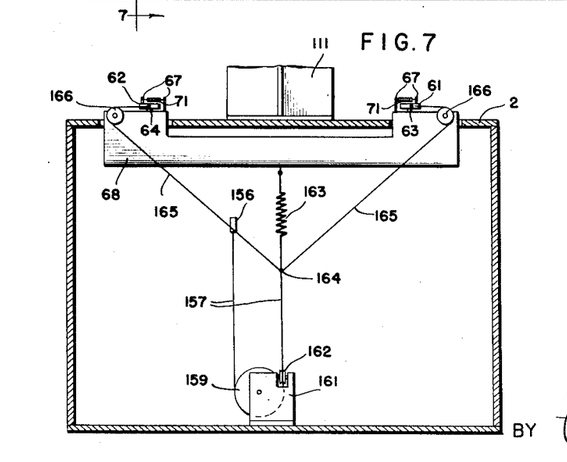
Fig. 7 is a vertical section taken on line 7—7 of Fig. 6 to illustrate in detail a portion of the control mechanism of the record-reversing mechanism.

For reversing records after one side has been reproduced, there is provided a record-reversing member (Figs. 1, 2, 6 and 7) comprising a pair of arms 61 and 62 pivotally mounted at 63 and 64, respectively, on extensions 66, 66 of member 68 which is pivoted to the base plate by, for example, a hinged member 69 (Fig. 6). Each of the arms 61 and 62 is biased to a normal rest position adjacent each side of the turntable by spring members 71, 71 secured to each of the extensions 66, 66 by pin members 67, 67.

Figure 15:
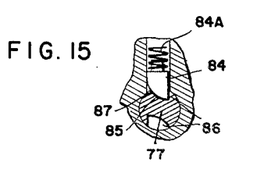
Fig. 15 is a sectional view taken on line 15—15 of Fig. 13.

For grasping a record on the turntable, there is provided at the outer ends of the arms 61 and 62 a pair of record-grasping mechanisms 73 and 74. The record-grasping mechanism 73 on arm 61 is provided with a control mechanism (Figs. 13 and 14) for rotating and reversing a record. This control mechanism comprises a bushing 76 extending into arm 61 and fixed thereto for rotatably mounting one end of a shaft 77. At the other end of the shaft 77 there is provided a channeled record-engaging member 78 within which is affixed a notched resilient cushion 79. The notch provides a means of guiding the grasping member into firm engagement with the periphery of the record on the turntable even though arms 61 and 62 are not in exact vertical alignment with the record. Shaft 77 is provided with a pin member 81 fixed to the inner end of the shaft and urged into a recess 82 in bushing 76 by a spring 83. Spring 83 is compressed against shaft 77 by means of a screw-threaded member 77A which is threaded to the outer end of bushing 76. When member 79 engages a record on the turntable, shaft 77 is moved inwardly with respect to bushing 76 whereby pin 81 is removed from recess 82 and shaft 77 may be rotated with respect to the bushing. For rotating shaft 77 and therewith record-engaging member 79, there is provided a pulley 80 fixed to shaft 77 by means of a pawl member 84 (Figs. 13 and 15) having a cam surface 85 for engaging either of two 180° displaced recesses 86, 86 in shaft 77. Pawl 84 is biased toward recesses 86, 86 by spring 84A. The recesses 86, 86 are identical and each includes a cam surface 87 which cooperates with cam surface 85 of pawl 84. Referring to Fig. 15, it is to be noted that pulley 80 may rotate in a counterclockwise direction about shaft 77, whereas pawl 84 locks pulley 80 to shaft 77 when the pulley is rotated in a clockwise direction.

Figure 5:
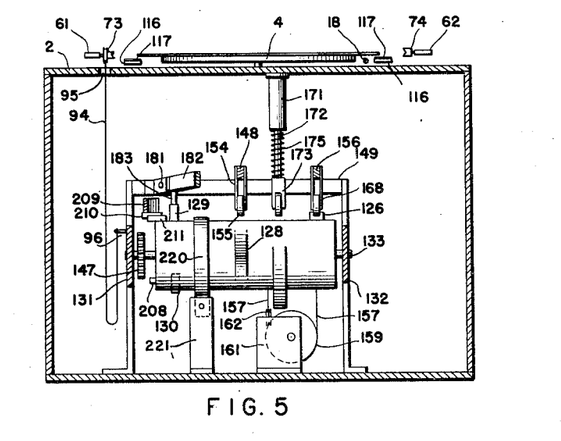
Fig. 5 is a vertical section taken on line 5—5 of Fig. 3 also illustrating parts of the change-cycle control mechanism.
Figures 9, 13, 14:
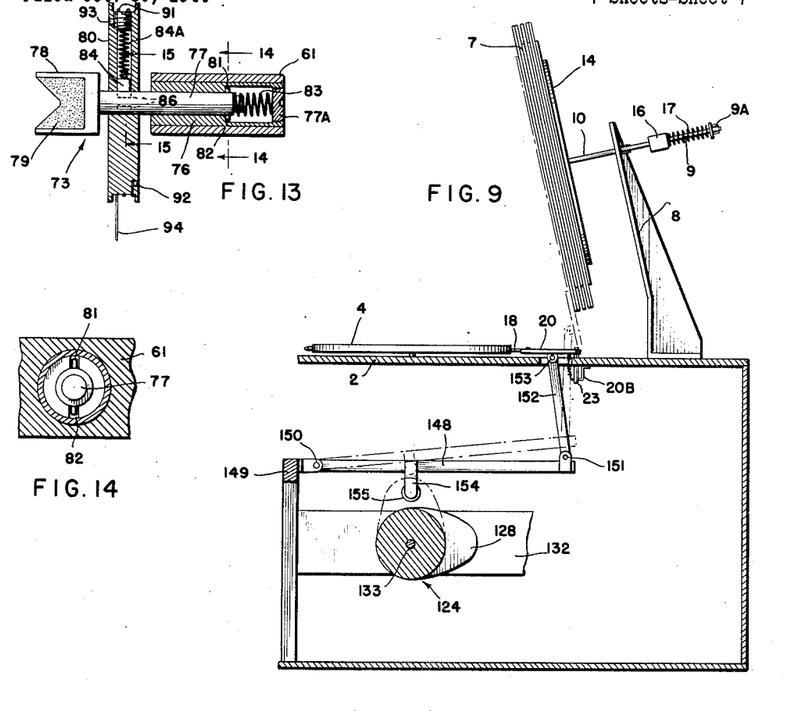
Fig. 9 is a section taken on line 9—9 of Fig. 4, with certain parts omitted, illustrating the record- releasing and conveying mechanism together with its control means.
Fig. 13 is an enlarged sectional view taken on line 13—13 of Fig. 2 illustrating the record-grasping mechanism.
Fig. 14 is a sectional view taken on line 14—14 of Fig. 13.
Figure 10:
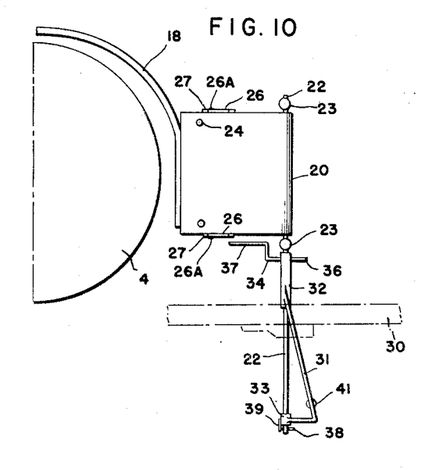
Fig. 10 is an enlarged fragmentary elevational view taken on line 10—10 of Fig. 3 illustrating the record-releasing and conveying mechanism.

For rotating pulley 80 and shaft 77 in a counterclockwise direction, there is provided a spring member 90 one end of which is fixed to arm 61 by a pin 90A and the other end of which is connected to pulley 80 by means of a cable 91 secured to pulley 80 as at 92 (Fig. 13). As will appear in subsequent explanation, the purpose of spring 90 and cable 91 is for returning pulley 80 to a normal position with respect to shaft 77. For rotating shaft 77 and therewith record-engaging member 78 in a clockwise direction, there is provided a second cable 94 which is secured to pulley 80 at 93 (Fig. 13) and extends downwardly through an aperture 95 in base plate 2 to a fixed member 96 (Fig. 5). When arm 61 is raised to a certain extent during a record-reversing cycle, cord 94 becomes taut and thereby rotates pulley 80 through 180° as the arm 61 continues to rise. There is provided on arm 62 a similar record-grasping mechanism 74 except that no pulley is provided on shaft 77.

Figure 1:
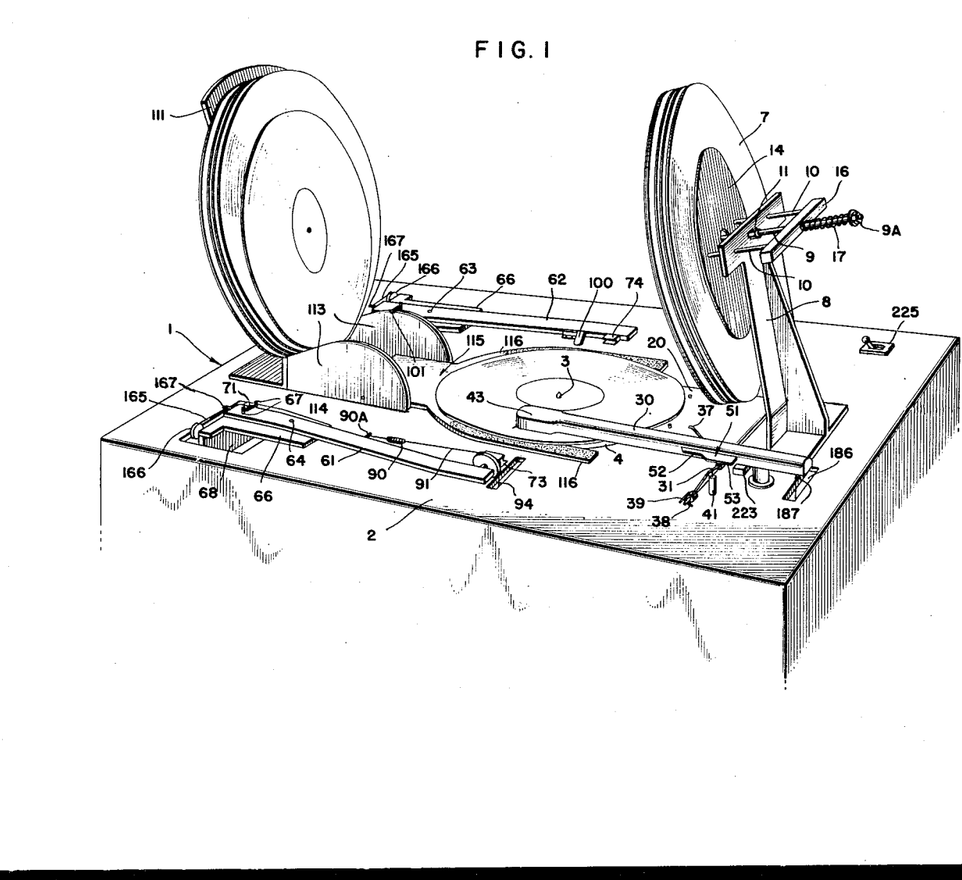
Fig. 1 is a perspective view of an automatic phonograph including a record-handling mechanism and record-storing means.

For limiting the rotation of a record to 180°, there is provided on arm 62 a stop 100 (Figs. 1 and 2) for engaging the outer periphery of a record after it is rotated through 180°. As illustrated in Fig. 1, stop 100 is tilted downwardly whereby it projects underneath a record on the turntable when the arms 62 move inwardly whereby a record is permitted to rotate through substantially 180° in a clockwise direction at which time it engages the underside of the stop.

Adjacent the turntable and fixed to base plate 2, there is provided a second record-storing magazine consisting of an upright bracket 111 at the upper end of which is secured a pair of cushions 112, 112 such, for example, as felt or rubber pads. Between the base of the upright bracket and the turntable, there is provided a pair of spaced arcuate-shaped record guides 113, 113 for engaging the periphery of the record as it is elevated from the turntable and guiding the record into a rest position as illustrated in Fig. 1 of the drawings. Guides 113, 113 are provided with notches 101 (Fig. 8) which are adapted to engage and retard the lower edge of the record whereby the upper edge may be moved until the center of gravity of the record is moved beyond the vertical plane of the notches whereby it is insured that the records may be tipped back into the position of rest as shown.

For moving records from the turntable to the record-storing member 111, there is provided a record-elevating member 115 (Figs. 1-3, 5, 9 and 10) which is journalled on shaft 114 which in turn is pivoted in the record guides 113. The record-elevating member comprises a pair of arms 116 which normally rest adjacent each side of the turntable as illustrated in Fig. 1. It is to be noted that curvilinear member 18 of the record-releasing and conveying means normally rests between one of the arms 116 and the turntable. The upper surface of arms 116 may be provided with a cushion 117 such, for example, as felt or rubber which is adapted to engage frictionally the underside of a played record and retard to a limited degree its motion toward guides 113 while the record is being elevated.

For controlling the record-handling mechanism which has been described hereinbefore, there is provided beneath the base plate 2 a unitary cam member 124 (Figs. 3, 4 and 5) consisting of a plurality of cam surfaces 126, 127, 128 and 129 which are disposed in predetermined angular relation with one another for operating in predetermined time relationship the various elements of the record-handling mechanism and the tone arm. Cam 124 is supported between horizontal supports 131 and 132 on shaft 133. For driving cam 124 there is provided a motor 136 mounted on a horizontal support 134. Motor 136 drives cam 124 through a mechanical linkage consisting of a pulley 137, belt 140, pulley 138, shaft 139, worm 142, gear 143, shaft 144, sprocket 146, chain 145 and sprocket 147 on shaft 133 of cam 124. Shaft 139 may be journalled in suitable bearings 141 which are fixed to support 134 and shaft 144 may be journalled in support 131.

For connecting cam surface 128 with the plate 20 of the record-releasing and conveying means, there is provided a lever 148 (Figs. 3, 4, 5 and 9) which is pivotally mounted at one end as at 150 on the bar 149 which extends between supports 131 and 132. The other end of lever 148 is pivotally connected at 151 to upwardly extending lever 152, the other end of which is affixed as at 153 to plate 20 of the record-releasing and conveying means. Depending from lever 148 there is provided a cam follower consisting of a bracket member 154 and a rotatable element 155. The cam follower is actuated at a predetermined time during the change cycle by cam surface 128 to pivot the record-releasing and conveying member upwardly into engagement with the first record in the magazine. It is to be noted that after the record-releasing and conveying means engages this record, further movement of cam 128 causes the record-releasing and conveying means to ride upwardly on studs 23 against the action of spring 20A and one of the record-engaging members 24 or 26 meets the lower peripheral edge of the record depending on the diameter thereof. Still further movement of cam 128 causes the record-engaging members 24 or 26 to move a record off the spindle 9. Further rotation of the cam 128 allows spring 20A to lower the record-conveying member and pivot it downwardly until a record is placed on the turntable.

For actuating the record-reversing arms 61 and 62 together with the associated hinged member 68, there is provided in operative relation to cam surface 126 a lever 156 pivoted as at 156A to a standard on support 134 (Figs. 3-7). For connecting the free end of lever 156 with the record-reversing means, there is provided a cable 157 including a spring 158 connected at 158A to lever 156. Cable 157 extends downwardly over a pulley member 159 which is pivoted in the brackets 161 attached to a frame member of the apparatus. On one of the brackets there is arranged a pulley 162 over which the cable extends upwardly into attachment with a spring 163 anchored to member 68. Extending from a junction point 164 on cable 157 is a pair of cables 165 each of which extends around pulleys 166 affixed to each end of member 68. The free ends of the cables are connected at 167 to arms 61 and 62 of the record-reversing means. Lever 156 is connected to cam 126 by means of a cam follower 168 which imparts motion to the lever and through the cable moves the record-reversing means as will be explained hereinafter.

For operating the record-elevating device 115, there is provided a linkage (Figs. 3, 4, 5 and 8) in operative relation to cam surface 127 consisting of a lever 121, a stud 171 affixed to base plate 2, a spring-biased rod 172 supported within stud 171 and the cam follower 173 fixed at the lower end of rod 172 which is urged into contact with cam 127 by spring 175. The cam follower is pivotally connected at 174 to rod 121, and rod 121 is pivotally connected at 175A to record-elevating member 115.

Figure 3:
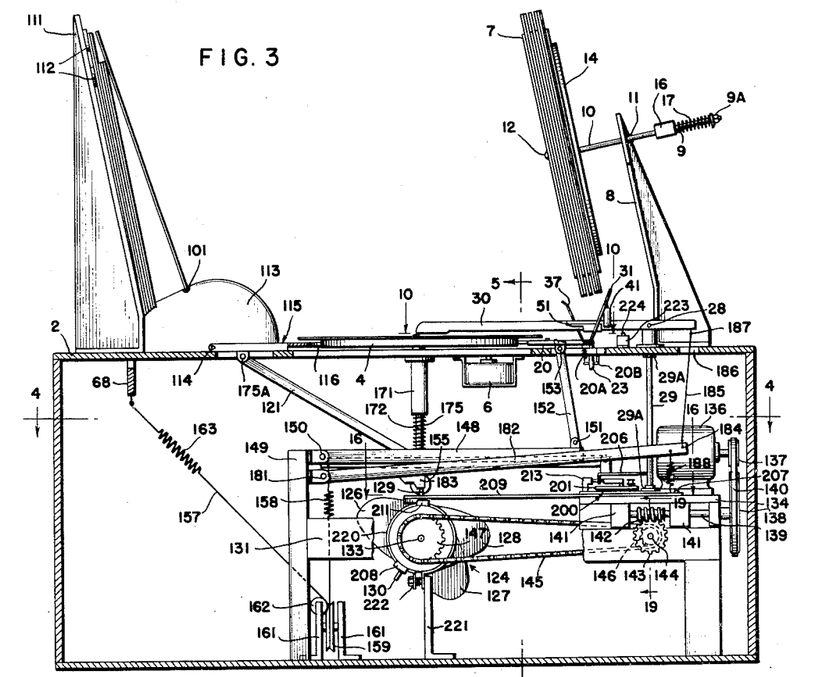
Fig. 3 is a side elevational view of the apparatus, certain parts being illustrated in section in order to reveal more clearly certain other parts.
Figure 4:
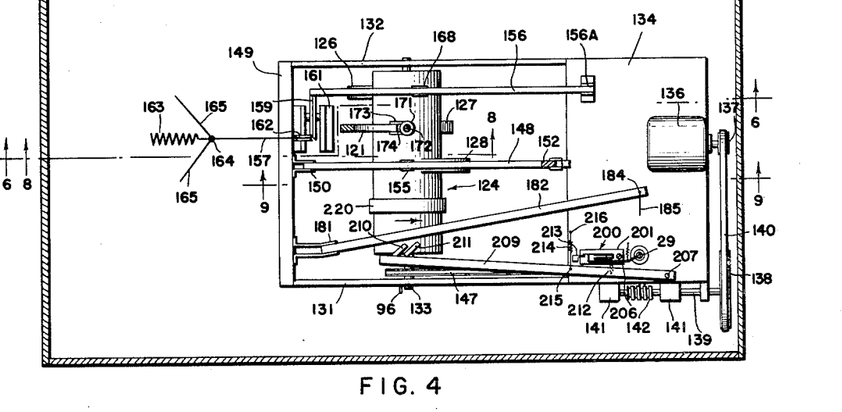
Fig. 4 is a horizontal section taken on line 4—4 of Fig. 3 for illustrating the change-cycle control mechanism.

For controlling the vertical motion of the tone arm in cooperation with cam surfaces 129 and 130, there is pivotally connected on bar 149 at 181 a lever 182 having cam follower 183 for engaging the cam surfaces 129 and 130. Cam surfaces 129 and 130 are spaced in proper relation to the other cam surfaces of unitary cam 124 to raise the tone arm while a record is placed on or removed from the turntable and also when it is elevated from the turntable to be reversed. The free end of lever 182 is connected to tone arm 30 by a cable 185 affixed to the lever at 184 and to the rear portion of the tone arm at 187. There is provided an aperture 186 in base plate 2 through which cable 185 extends. Referring to Figs. 3, 4 and 5 of the drawings, it is to be noted that lever 182 is horizontally displaced toward the center of the turntable with respect to the pivot point of the tone arm whereby spring member 188 fixed between lever 182 and frame member 131 lowers arm 182 when cam follower 183 disengages from cam surface 129 or cam surface 130 not only to elevate the tone arm about its pivot point but also to rotate it in a horizontal direction beyond the periphery of the turntable. When cam surfaces 129 or 130 engage cam follower 183 to elevate arm 182, the tone arm 30 is permitted to pivot downwardly into engagement with the guiding cam member 31 which cooperates with either cam surface 51 or 52 to place the tone arm in the initial playing groove of a record.

Figure 16:
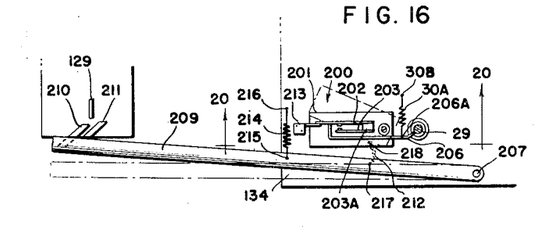
Fig. 16 is an enlarged sectional view taken on line 16—16 of Fig. 3 illustrating the switch means which cooperates with the tone arm for controlling the change-cycle control means and its drive means.

For initiating and terminating the operation of the record-handling mechanism during a record-changing cycle or a record-reversing cycle, there is provided as illustrated in Fig. 16 a switch assembly 200 for controlling the motor 136 which drives the unitary cam 124 through either a record-changing cycle or a record-reversing cycle. Switch 200 is secured in suitable fashion to a plate 201 which in turn is rotatably secured to horizontal support 134. There are provided spring contacts 202 and 203 which are secured to and separated by a suitable insulating member 203A. Contacts 202 and 203 are deformed or otherwise arranged so that they tend to engage one another. Plate 201 is pivotally mounted and spring-biased by a spring member 204 into frictional engagement with horizontal support 134. For operating spring contacts 202 and 203, there is provided a lever member 206 anchored in the tone arm shaft 29. As the tone arm enters the tripping groove of a record on the turntable, shaft 29 moves lever 206 into engagement with contact 201 and thereby rotates plate member 201 into the dotted-line position shown in Fig. 16 thereby permitting contacts 202 and 203 to close and energize motor 136 as will be explained in connection with the circuit illustrated in Fig. 17. For biasing the tone arm into playing engagement with the playing groove of a record, there is provided spring 30A secured to lever 206 at 206A and to support 134 at 30B.

For moving switch 200 to the full-line position shown in Fig. 16 to terminate a change cycle, there is provided a lever 209 which is pivoted to member 134 at 207 and biased to the position shown in Fig. 16 by a spring member 214 secured to lever 209 at 215 and to the supporting member 134 at 216. The free end of lever 209 is provided with cam follower 210 which is disposed to engage cam surface 208 or cam surface 211 on cam 124 at the end of a change cycle or at the end of a reversing cycle. For connecting switch 200 to rod 209, there is provided a flexible linkage such, for example, as a chain 212 attached to lever 209 at 217 and to switch 200 at 218. As the change cycle or the record-reversing cycle is completed, cam surfaces 208 or 211 on cam 124 move lever 209 to the dotted-line position shown in Fig. 16 whereby chain 212 moves switch 200 to the full-line position shown in Fig. 16. There is provided a fixed stop member 213 secured to member 134 for engaging contact 202 as switch 200 moves to its full-line position and opening contacts 202 and 203 to de-energize the motor circuit, thereby to terminate the change cycle or the record-reversing cycle.

For preventing cam 124 from overrunning at the termination of a change cycle or a record-reversing cycle, there is provided a brake member 220 (Figs. 3–5) which is adjusted frictionally to engage the peripheral surface of cam 124. Brake 220 is supported from the frame of the apparatus by a standard 221 and is adjustable by a threaded member 222 which engages the ends of the brake and standard 221.

Figures 8, 17:
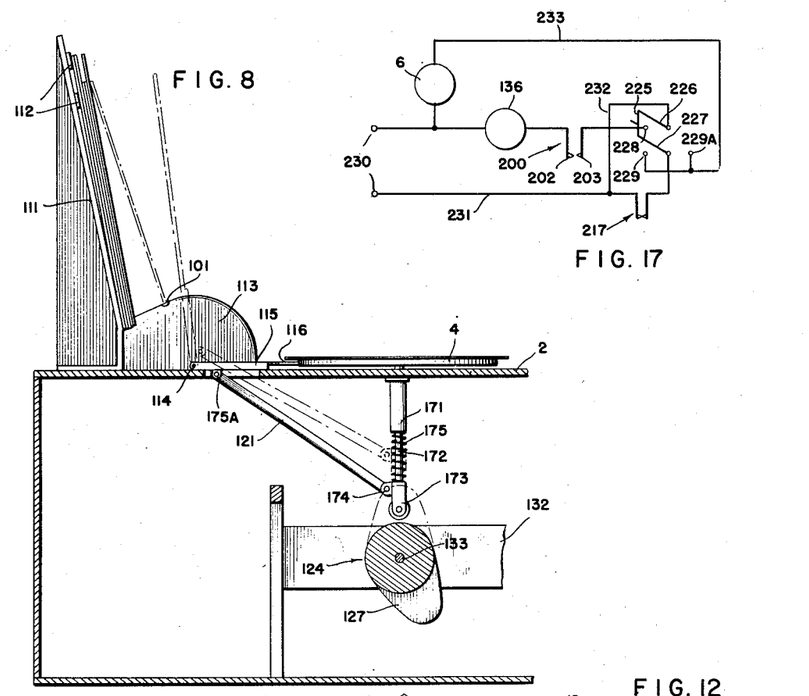
Fig. 8 is a partial section taken on line 8—8 of Fig. 4 illustrating the mechanism for controlling the record-elevating and discarding means.
Fig. 17 is a circuit diagram illustrating the electrical control circuit which controls the automatic phonograph.

Referring to Figs. 1 and 17, there is provided for controlling the drive motors 6 and 136 a microswitch 223 having an actuator 224 of conventional construction mounted on the base plate 2 beneath the tone arm. Switch 225, mounted on the upper side of the base plate as illustrated in Fig. 1, energizes either the turntable motor alone or both the turntable motor 6 and the cycle control motor 136.

Referring to Fig. 17 of the drawings, there is provided a circuit consisting of a source of energy 230 such, for example, as a commercial alternating current power line in series with which are provided tone-arm operated switch 200, microswitch 223, switch 225 and motor 136. Switch 225 consists of mutually insulated movable conductor members 226 and 227 which are connected across the contacts of microswitch 223. Members 226 and 227 are simultaneously movable into engagement with contact 228, connected to one side of switch 200, and contact 229, connected to one terminal of the turntable motor 6. The other terminal of motor 6 is connected to source 230. Switch 225 is provided with a third contact 229A which is connected in common with contact 229 to motor 6. When switch 225 is in its left-hand position engaging contacts 228 and 229 and the tone arm is resting on a record, motor 6 is energized through conductor 231, microswitch 223, switch member 227, contact 229 and conductor 233. Motor 136 is energized through conductors 231 and 232, switch arm 226, contact 228 and switch 200. For manual operation, switch 225 is thrown to the right into engagement with contact 229A whereby only turntable motor 6 is energized through conductor 231, switch 223, switch arm 227, contact 229A and conductor 233.

For de-energizing motors 6 and 136 after all of the records have been played, microswitch 223 is positioned to be engaged by tone arm 30 when the tone arm is returned to its playing position. Since there is no record on the turntable, tone arm 30 drops below its normal level into engagement with switch-actuating member 224 thereby to open the circuit shown in Fig. 17 and de-energize both of the motors.

Considering the operation of the record-changer apparatus described hereinbefore, it will be assumed that a record is placed on the turntable and that a number of records of different diameters are placed on the first record-storing means by threading each record on spindle 9 against the action of spring 17 acting on disc 14. Thus there is provided a stack of records positioned in proper relation to the turntable to be moved thereto. If, for example, it is desired to reproduce a stack of records automatically, switch 225 is moved from the "off" position to the automatic playing position which is illustrated in Fig. 17 as the left-hand position. With switch 225 so operated, turntable motor 6 is energized through a circuit which may be traced from the lower terminal of source 230 through conductor 231, switch 223, switch arm 227, contact 229, conductor 233, turntable motor 6 and the upper terminal of source 230. Motor 6 having been so energized, the turntable 4 continuously rotates.

Having placed a record on the turntable and tone arm 30 in engagement with the ititial playing groove of a record, the phonograph operates in a normal manner whereby tone arm 30 eventually enters a spiral or eccentric tripping groove which is normally provided on commercial records. The spiral or eccentric tripping groove moves tone arm 30 a predetermined distance toward the center of the record on the turntable at which time tone arm shaft 29 (Fig. 16) moves lever 206 into engagement with spring contact 202 thereby to rotate switch assembly 200 in a clockwise direction and disengage spring contact 202 from stop member 213. By reason of the spring action of contact 202 and its tendency to move in a counterclockwise direction with respect to plate 201, switch assembly 200 eventually rotates to such a point that contacts 202 and 203 close and complete a circuit (Fig. 17) from source 230 through conductor 231, conductor 232, switch arm 226, contact 228, contacts 202 and 203, change-cycle control motor 136, and source 230.

Change-cycle control motor 136 starts and drives unitary change-cycle control cam 124 in a clockwise direction (Figs. 3 and 4) against the friction of brake 215 through a mechanical linkage consisting of motor pulley 137, belt 140, pulley 138, shaft 139, worm 142, gear 143, shaft 144, sprocket 146, chain 145, sprocket 147 and shaft 133 of unitary change-cycle control cam 124. As the cam 124 starts to rotate, the tone-arm control cam surface 129, which is normally in engagement with cam 183 on tone-arm control lever 182, disengages from cam 183, allowing lever 182 to drop under the biasing action of spring 188 attached thereto. Since tone-arm control lever 182 is horizontally displaced toward the center of the turntable with respect to tone arm 30, it exerts a downward and horizontal pull through cable 185 on the rear portion of tone arm 30 to rotate the tone arm vertically and horizontally off the record and beyond the periphery of the record on the turntable.

At this time, cam surface 126 (Figs. 6 and 7) on unitary change-cycle control cam 124 engages the cam follower 168 of lever 156 thereby to move lever 156 in a clockwise direction about its pivot 156A. In so doing, lever 156 exerts tension on cable 157 thereby pulling this cable around the peripheries of pulleys 159 and 162 and exerting tension on cables 165 which are attached to arms 61 and 62 of the record-reversing means. At the same time, tension is exerted on spring 163 which is attached to cable 157 and to member 68 of the record-reversing means. However, spring 163 is chosen to flex while cables 165 move arms 61 and 62 about their pivot points 63 and 64 against the tension of springs 71, 71 into engagement with the periphery of the record on the turntable. Arms 61 and 62 pivot until record-gripping members 73 and 74 (Figs. 1, 2 and 13) firmly engage the periphery of the record on the turntable. The pressure on members 73 and 74 causes the shafts 77 of these members to move inwardly and thereby free pins 82 from recesses 81 in bushings 76 whereby the grasping means 73 and 74 are free to rotate in bushings 76.

As cam 126 continues to rotate, lever 156 exerts further tension on cable 157 and cables 165 but arms 61 and 62 cannot move further about their pivot points and therefore the downward tension on pulleys 166 and the downward tension of spring 163 pivots member 68 about hinge 69 whereby the arms 61 and 62 are raised to the dot-dash line position indicated in Fig. 6. When the record is raised above the turntable to a point equal in distance to the radius of a record or to a point slightly more than this, the slack in cable 94 (Fig. 5) attached to pulley 80 is taken up and pulley 80 is caused to rotate in a clockwise direction. When pulley 80 rotates, it may turn freely on shaft 77 until spring member 84A forces pawl 84 into the recess 86 in shaft 77 at which time this shaft and record-grasping member 73 is rotated with the pulley. The record is rotated in a clockwise direction until it engages stop member 100 (Fig. 1) on arm 62.

At this time, cam surface 126 lowers lever 156 thereby relieving the tension on cables 157 and 165 and allowing arms 61 and 62 to rotate downwardly until the record is placed on the turntable in reversed position. As arms 61 and 62 move downwardly, the cable 91, under the influence of spring 90, rotates the pulley 80 in a counterclockwise direction at least until pawl 84 enters the second of the notches 86 in shaft 77 thereby to rewind the cable 94 on pulley 80. Pulley 80 can rotate in a counterclockwise direction without rotating the record by reason of the pawl 84 being permitted to recede from the recess 86 when the pulley is urged in a counterclockwise direction.

After the record is placed on the turntable, cam 126 allows lever 156 to assume its normal rest position and springs 71 move arms 61 and 62 outwardly away from the record whereby to release the record and permit record-engaging members 73 and 74 to move outwardly with respect to arms 61 and 62 until pins 81 seat in recesses 82 under the influence of springs 83. When pins 81 are so seated, members 73 and 74 are maintained in a horizontal position for engaging a record during the next succeeding record-reversing cycle.

Unitary change-cycle control cam 124 continues to rotate and the cam member 130 is rotated into engagement with cam follower 183 on tone-arm control lever 182 to elevate the lever and therewith the rear end of the tone arm 30. As the forward end of the tone arm is lowered, cam portion 52 or cam portion 53 of cam 51 engages cam-guiding member 31 to guide the tone arm into the initial playing groove of the record. This operation will be further described hereinafter.

Simultaneously with the engagement of cam 130 and cam follower 183, cam 208 on unitary change-cycle control cam 124 engages the cam surface 210 on lever 209 and moves it to the dot-dash line position shown in Fig. 16, at which time cam 210 escapes past cam 211 whereupon spring 214 moves lever 209 back to full-line position. As lever 209 moves to the dot-dash line position, it exerts tension on chain 212 and moves switch 200 in a counterclockwise direction until contact 202 engages stop member 213 and opens contacts 202 and 203, whereupon motor 136 is de-energized and brake member 215 immediately stops the unitary change-cycle control cam 124. It is to be noted that lever 206 on tone arm shaft 29 is moved away from switch 200 when the tone arm is moved outwardly beyond the periphery of a record whereby at the completion of the record-reversing cycle contact 202 is permitted to engage stop 213.

The reversed record is played through until the tone arm enters the tripping groove of the record at which time switch 200 is again actuated as explained in connection with the record-reversing cycle. Motor 136 is energized and cam 124 again commences to rotate. At this time cam surface 127 (Fig. 8) engages cam follower 173 and elevates it against the action of spring 175. Lever 121 is thereby moved to the dot-dash line position shown in Fig. 8 to pivot record-elevating member 115 upwardly. The arms 116 engage the underside of the record on the turntable and elevate it out of engagement with the turntable and the centering spindle until eventually the record moves slowly against the friction of material 117 on arms 116 into contact with guides 113. Further rotation of cam surface 127 moves the record over guide members 113 until the lower periphery of the record engages in notches 101 in members 113. Continued rotation of cam 127 continues the motion of record-elevator 115 which moves the upper periphery of the discarded record toward the second record-storing member 111 until the center of gravity of the record is moved through the vertical plane of notches 101 at which time (see dot-dash position, Fig. 8) the upper periphery of the record moves into engagement with the cushions 112 on member 111 or until it engages other records already resting against cushions 112. The discarded record continues to rest in notches 101 until a subsequent record is moved into contact with the lower periphery thereof to displace the previous record and itself enter notches 101. Further rotation of cam surface 127 allows cam follower 173 to move downwardly under the influence of spring 175 thereby to move record-elevating member 115 back to its normal rest position adjacent the turntable.

As member 115 approaches its normal rest position, cam surface 128 (Fig. 9) moves into engagement with the cam follower 155 on lever 148 thereby to elevate lever 148 and exert upward force on plate 20 of the record-releasing and conveying means. Plate 20 and curvilinear member 18 pivot about shaft 22 until plate 20 engages a record, for example, of small diameter, and moves pins 24 (Fig. 11) beneath the peripheral edge of the small record. If the record in position to be removed is a large diameter record, pins 24 move inwardly against the action of springs 25 and high portions 27 of latches 26 also engage the surface of the large record and pivot hook portions 26B of latches 26 into engagement with the peripheral edge of the large record. After the pins 24 or the latches 26 engage the peripheral edge of a record, further rotation of cam surface 128 causes plate 20 and therewith the pins 24 and latches 26 to move upwardly against the tension of spring 20A and under the guidance of studs 23 which are disposed in the base plate 2. As the member 20 moves upwardly, either the pins 24 or the latches 26 move the record upwardly until the walls of the centering aperture clear the projection 12 on spindle 9 at which time the upper portion of the record moves forward into engagement with the curvilinear member 18. It is to be noted that when one record is moved clear of projection 12, spring 17 forces disc 14 forward to move another record into position for removal. Further movement of cam 128 causes springs 20A to lower plate 20 and pivot it downwardly whereby the curvilinear member 18 guides the record to the turntable.

If the record being moved to the turntable is a large record, it engages during its movement to the turntable the extension 37 attached to the cam guide 31 whereby this member is moved forward in a counterclockwise direction. Therefore, as the tone arm is lowered, the cam surface 52 of cam 51 on tone arm 30 engages the guide 31 and the tone arm is moved downwardly and horizontally into the initial playing groove of a large record. If the record being moved to the turntable is a small record, it does not engage the extension 37 and therefore the guide member 31 remains in the position illustrated in Figs. 1 and 11. When the tone arm is lowered to engage a small record, cam surface 53 on cam 51 on the tone arm engages the guide member 31 and since this surface projects a greater distance from the tone arm than does the surface 52, the tone arm is moved further toward the center of the turntable into engagement with the initial playing groove of a small record.

Figures 11, 12:
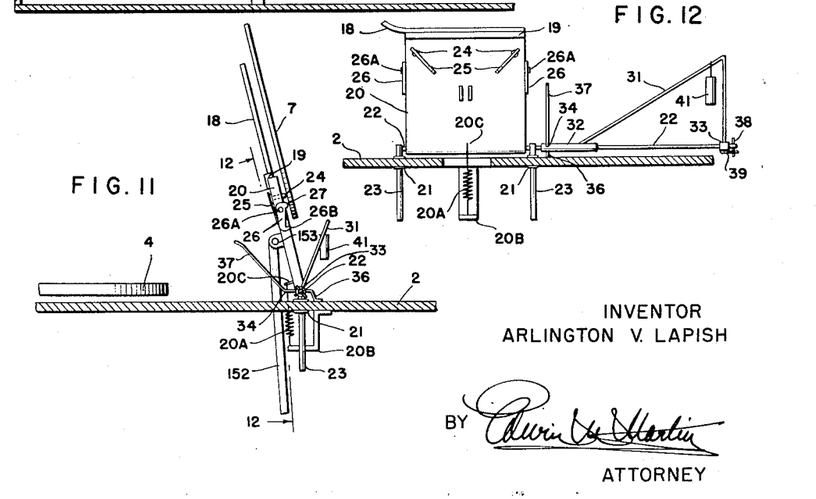
Fig. 11 is a fragmentary side elevational view of the record-releasing and conveying mechanism of Fig. 10 illustrating it in position to engage and release a record from the magazine.
Fig. 12 is a sectional view taken on line 12—12 of Fig. 11 illustrating details of the tone-arm positioning cam and the record-releasing and conveying means.

The guide member 31 is moved to its position for a small record shown in Figs. 1 and 11 each time that the record-releasing and conveying member is pivoted upwardly. As the plate 20 is pivoted upwardly, shaft 22 is rotated in a clockwise direction and pin 38 engages an extension 39 (Fig. 10) on guide member 31 to move it in a clockwise direction in case the previously played record was a large one. If the previously played record was a small one, member 31 is of course already in the position for guiding the tone arm into engagement with a small record.

Further movement of the unitary control cam 124 brings cam surface 129 back into engagement with cam follower 183 on lever 182 thereby to lower the tone arm as described hereinbefore.

As the cam surface 129 engaged cam follower 183 on the tone arm control lever 182, the cam surface 211 also engaged cam follower 210 on lever 209 whereby switch 200 is operated to de-energize the motor 136 and terminate the change cycle.

Each record in the first record-storing magazine is played on each side as described hereinbefore until all of the records are moved into the second record-storing means 111. At the completion of the operation of moving the last record into position on record-storing means 111, tone arm 30 is lowered as before when a new record was placed on the turntable. However, since there is no record on the turntable, it drops below the normal level of the playing surface of a record on the turntable and engages the operating member 224 of microswitch 223 thereby to open the circuit to the turntable motor 6 to stop the turntable.

The invention described hereinbefore offers a number of important advantages particularly with respect to the manner in which records are changed and reversed. It is to be noted that, during the reversing operation, the record being handled is substantially never allowed to move freely but is positively engaged at all times. The change-cycle control mechanism is extremely simple in that a single cam operates a plurality of levers to perform the record-changing and record-reversing cycles. No delicate adjustments are required whereby to eliminate troubles which frequently occur in complicated and delicate mechanisms.

It is not intended that this invention shall be limited to the specific mechanical devices shown herein. For example, it will be obvious to those skilled in the art that any form of magazine may be used for storing records so long as it cooperates with the record-handling mechanism in the manner described herein. Also, the specific supporting devices and pivoting devices can be altered in many ways familiar to those skilled in the art without going beyond the scope of this invention.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an automatic phonograph including a turntable, a pair of arms disposed in movable relation with respect to a record on said turntable, record-engaging means at the ends of said arms adjacent said record comprising a pair of rotatable members, each rotatable member comprising a laterally movable shaft, record-grasping means fixed to one end of each of said shafts that when grasping a record moves said shaft laterally in one direction, a notched member on the end of one of said arms for rotatably supporting said shaft, a projection on said shaft adjacent said notched member, biasing means acting against one end of said shaft normally urging it laterally in the opposite direction to move said projection into said notch thereby to index said grasping means into a normal position for engaging a record, one of said rotatable members including a pulley mounted on said shaft, means operatively associated with said pulley and said shaft for positively engaging said pulley with said shaft only when said pulley is rotated in a predetermined direction and means connected to said pulley for rotating it 180° in said predetermined direction and thereafter 180° in reverse direction.

2. In an automatic phonograph including a turntable, a pair of arms disposed in movable relation with respect to a record on said turntable, record-engaging means at the ends of said arms adjacent said record comprising a pair of rotatable members, each rotatable member comprising a laterally movable shaft, record-grasping means fixed to one end of each of said shafts that when grasping a record moves said shaft laterally in one direction, a notched member on the end of one of said arms for rotatably supporting said shaft, a pin fixed to said shaft adjacent said notched member, biasing means operatively associated with said pin for moving it laterally in the opposite direction into said notch thereby to index said grasping means into a normal position for engaging a record, one of said rotatable members including a pulley freely mounted on said shaft, means operatively associated with said pulley and said shaft for positively engaging said pulley with said shaft only when said pulley is rotated in a predetermined direction and means connected to said pulley for rotating it 180° in said predetermined direction and thereafter 180° in reverse direction.

3. In an automatic phonograph including a turntable, a pair of arms disposed in movable relation with respect to a record on said turntable, record-engaging means at the ends of said arms adjacent said record comprising a pair of rotatable members, each rotatable member comprising a laterally movable shaft, record-grasping means fixed to one end of each of said shafts that when grasping a record moves said shaft laterally in one direction, a notched member on the end of one of said arms for rotatably supporting said shaft, a pin fixed adjacent the other end of said shaft adjacent said notched member, a spring operatively associated with said pin for biasing it laterally in the opposite direction into said notch thereby to index said grasping means into a normal position for engaging a record, one of said rotatable members including a pulley freely mounted on said shaft, ratchet means operatively associated with said pulley and said shaft for positively engaging said pulley with said shaft when said pulley is rotated in a predetermined direction and means connected to said pulley for rotating it 180° in said predetermined direction and thereafter 180° in reverse direction.

ARLINGTON VICTOR LAPISH.

REFERENCES CITED

The following references are of record in the file of this patent:

UNITED STATES PATENTS

| Number | Name | Date |
|---|---|---|
| 1,406,604 | Brooks et al. | Feb. 14, 1922 |
| 1,474,776 | Hunt | Nov. 20, 1923 |
| 1,807,073 | Schulz | May 26, 1931 |
| 1,889,786 | Mills | Dec. 6, 1932 |
| 1,955,939 | Bishop | Apr. 24, 1934 |
| 1,962,858 | Collison et al. | June 12, 1934 |
| 1,967,599 | Thompsett et al. | July 24, 1934 |
| 2,063,573 | Yeider | Dec. 8, 1936 |
| 2,178,978 | Uemura | Nov. 7, 1939 |
| 2,238,612 | Tsuchiya | Apr. 15, 1941 |

FOREIGN PATENTS

| Number | Country | Date |
|---|---|---|
| 699,379 | Germany | Nov. 28, 1940 |